United States Patent [19]

Siegel

[11] Patent Number: 5,392,095
[45] Date of Patent: Feb. 21, 1995

[54] CUSTOMER FEEDBACK DEVICE ON A MACHINE CONSOLE

[75] Inventor: Robert P. Siegel, Penfield, N.Y.

[73] Assignee: Xerox Corporation, Stamford, Conn.

[21] Appl. No.: 160,649

[22] Filed: Dec. 2, 1993

[51] Int. Cl.⁶ ............................................. G03G 21/00
[52] U.S. Cl. .................................. 355/200; 355/204; 355/205; 355/207; 355/208
[58] Field of Search ................ 355/200, 202, 203–209; 371/16.4, 17, 18, 29.1

[56] References Cited

U.S. PATENT DOCUMENTS

| | | | |
|---|---|---|---|
| 3,842,408 | 10/1974 | Wells | 340/216 |
| 4,224,613 | 9/1980 | Kaiser et al. | 340/679 |
| 4,922,294 | 5/1990 | Nakagami et al. | 355/209 |
| 5,010,551 | 4/1991 | Goldsmith et al. | 355/206 X |
| 5,057,866 | 10/1991 | Hill, Jr. et al. | 355/200 |
| 5,077,582 | 12/1991 | Kravette et al. | 355/209 X |
| 5,081,699 | 1/1992 | Filiou et al. | 355/206 X |
| 5,138,377 | 8/1992 | Smith et al. | 355/207 |
| 5,202,726 | 4/1993 | McCulley et al. | 355/206 |
| 5,282,127 | 1/1994 | Mii | 355/206 X |
| 5,287,505 | 2/1994 | Calvert et al. | 371/18 X |
| 5,293,196 | 3/1994 | Kaneko et al. | 355/200 |

OTHER PUBLICATIONS

Translation of Japan Patent Document 60-90460, Akira Ikoma inventor, Abstract Publication Date of May 21, 1985. [Copy in N. Ramirez Digest].
*Research Newsletter*, "Remote Diagnostics–Tool Kit of the Future", Ritter, Lynn, (1989).
Xerox Disclosure Journal, vol. 18, No. 2, Mar./Apr. 1993, p. 145.

*Primary Examiner*—Matthew S. Smith

[57] ABSTRACT

A method of notification to a remote customer support service in response to an operator's dissatisfaction with either machine performance or copy quality is initiated by the operator pressing a dialog button on the console of the machine to start an interactive feedback session through the machine interface. The button signals notification to a remote station. The remote location interacts with the operator to remove the source of dissatisfaction with the help of the operator, through an automated adjustment of machine control parameters or dispatch of a service technician.

12 Claims, 5 Drawing Sheets

CUSTOMER FEEDBACK DEVICE ON A MACHINE CONSOLE

BACKGROUND OF THE INVENTION

The invention relates to user interfaces, and more particularly, to a customer feedback button on the console of such a user interface that is pressed by a customer in response to a perceived level of machine performance.

It is imperative that one improves customer satisfaction with machines in order to increase sales, therefore, it is of vital importance to know exactly what causes dissatisfaction and to know that as soon as it happens. If an assigned company representative was constantly on hand it would be possible for the customer to tell that representative, "I hate it when the machine does that". This information would be useful to use in servicing that particular account and in planning future products. In servicing the account one could come to understand exactly what the customer's tolerance is for various conditions. For example, is a particular customer particularly disturbed by a certain type of copy defect which another customer may not mind at all.

Advanced systems like remote interactive communication (RIC) tells one precisely when a machine is not running within specification. With this information, a representative can visit the account from which the signal came and repair or adjust the machine. However, with RIC, one knows nothing about how this performance relates to that particular customer annoyance threshold. If one had some way of correlating the customers' dissatisfaction with a given machine state, one could come to understand that particular customer's requirements, and prioritize one's activities accordingly Many of the process controls in the xerographic machine involve trading off the performance of the machine with respect to one parameter against the performance of another. Some examples might include, paper throughput rate or range of papers accepted versus the risk of a jam; or the number of colors rendered versus resolution, or copy quality versus speed; or amount of background versus solid area performance. Thus, If customer A was extremely annoyed with any paper jams, but didn't seem to mind an occasional copy quality defect while customer B was extremely sensitive about copy quality and did not mind an occasional jam, the company representative could use this information to prioritize his activities in such a way as to optimize customer satisfaction.

In the prior art, U.S. Pat. No. 4,922,294 to Nakagami et al. discloses an image forming apparatus equipped with a sensor for detecting the requirement of replenishment and exchange of expendable supplies, parts and the like. The apparatus forms a pre-warning image (33) which is distinguishable from a regular image (35) on the same sheet on which a regular image is formed corresponding to an original (21) or other image data so that operators can easily recognize whether a pre-warning image is on the sheet or not while confirming the regular image. The pre-warning image is formed on a sheet whether it is a roll sheet or cut sheet whenever manual handling is necessary. See Col 1, lines 60–69, Col. 2, lines 1–5.

U.S. Pat. No. 4,224,613 to Kaiser et al. discloses a warning system for printing presses. The system provides a warning system for a printing press which sounds an acoustic warning when any one of a given set of running conditions is exceeded or departed from. See Col. 1, lines 38–41.

U.S. Pat. No. 3, 3,842,408 to Wells discloses a system for providing an indication of a remote condition or problem within a machine. A transmitter coupled to the machine operates to separately sense different conditions of the machine and transmits separate signals corresponding to the sensed condition of the machine. The signals are carried via the conventional electric power distributing lines to a receiver and indicator apparatus. The indicator apparatus functions to selectively sense the signals from the receiver to provide a visual indication of the sensed condition of the machine.

The Xerox Disclosure Journal, Vol. 18, No. 2 March/April 1993, page 145, discloses a system for automating customer satisfaction data surveys by including an electronic customer feedback interface in a machine.

Some of the limitations with prior art remote interactive communication (RIC) systems is that there is a limited amount of information that can be collected by electronic sensing means. There is also no direct correlation between the objective criteria which are set up by product designers to trigger a diagnostic alert, with the individual customer's own sensitivities. Additionally, in the case when the customer has reached his/her own tolerance threshold with the machine in the absence of a RIC alert, there is no contextually relevant data available, that would link directly to the incident or event which precipitated the service call, for the technician to utilize when he/she arrives on the scene.

Accordingly, it is an object of the present invention to provide a new and improved technique for notification of precise customer dissatisfaction with a performance quality of a particular machine. It is still another object of the present invention to improve customer satisfaction with a particular machine by the use of a RIC switch and collection of information on customer requirements for that particular customer's satisfaction. It is still another object of the present invention to allow the pre-setting of conditions demanding automatic calling to a remote operator. Other advantages of the present invention will become apparent as the following description proceeds, and the features characterizing the invention will be pointed out with particularity in the claims annexed to and forming a part of this specification.

SUMMARY OF THE INVENTION

Briefly, the present invention includes a method and apparatus that provides a "customer satisfaction" button on RIC equipped machines to allow a customer to press this button any time the machine performance is unsatisfactory, at which time the machine performance data is communicated to a service center in order to provide a "customized" service to each customer and ensuring that items that are of particular annoyance to each customer are serviced properly.

For a better understanding of the present invention, reference may be had to the accompanying drawings wherein the same reference numerals have been applied to like parts and wherein:

DETAILED DESCRIPTION OF THE DRAWINGS

Figure 1:
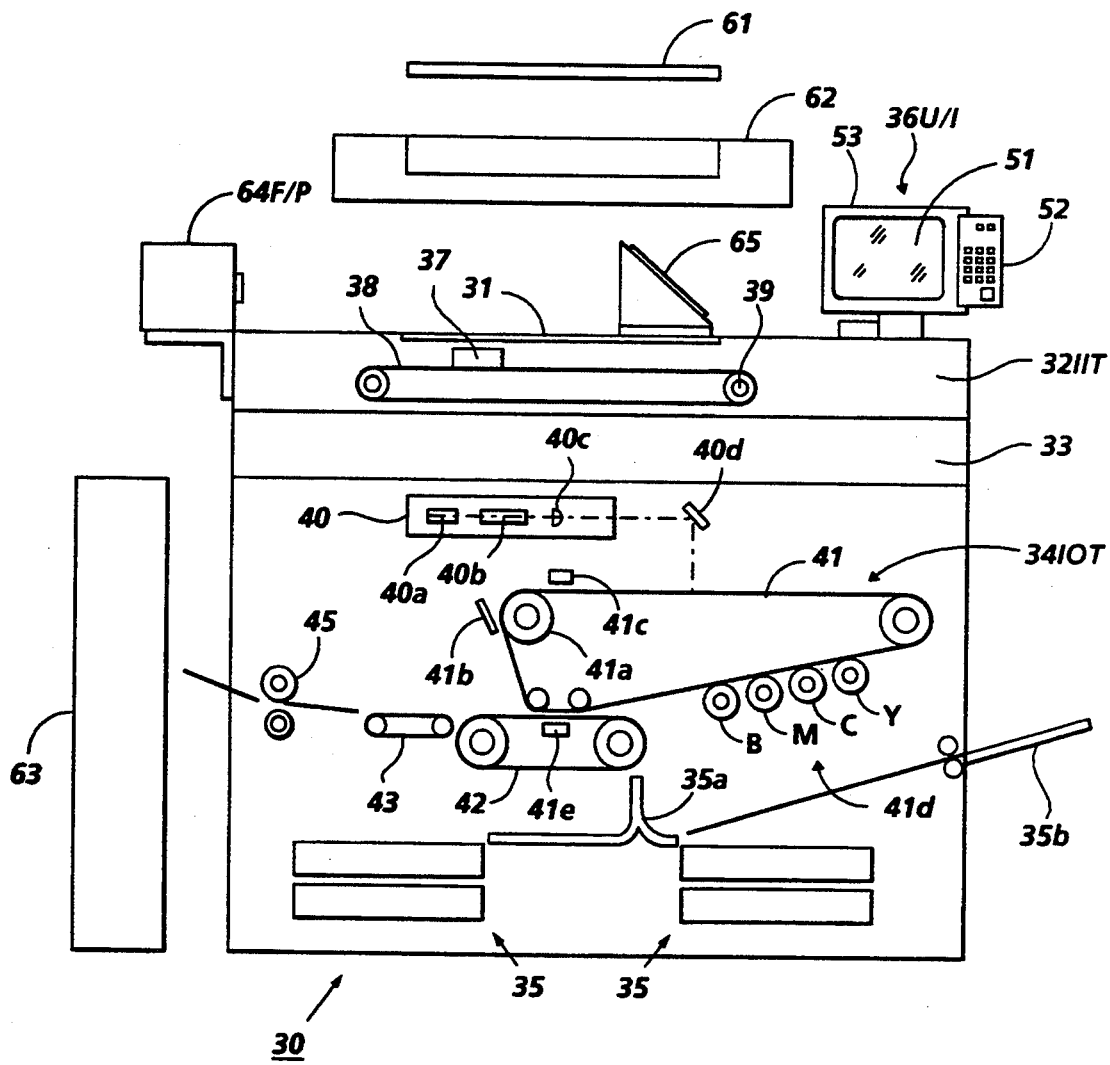
FIG. 1 is a schematic elevational view depicting various operating components and subsystems of a typical machine incorporating the present invention.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention.

DETAILED DESCRIPTION OF THE PREFERRED EMBODIMENT

For a general understanding of the features of the present invention, reference is made to the drawings. In the drawings, like reference numerals have been used throughout to identify identical elements.

FIG. 1 shows one example of the overall construction of a color copying machine to which this Invention is applied. A typical color copying machine to which this Invention is applied is formed with the base machine 30, composed of a platen glass plate 31, which carries the original sheet thereon, an image input terminal (IIT) 32, an electrical control system container 33, the image output terminal (IOT) 34, and a paper tray 35, and a user interface (U/I) 36 and also, as optional items, of an editing pad 61, an automatic document feeder (ADF) 62, a sorter 63, and a film projector (F/P) 64.

Electrical hardware is necessary for performing the control of the IIT, IOT, U/I, etc. mentioned above, and a plural number of boards for control of each of the processing units, such as the IIT, IPS (information processing system), U/I, F/P, and so forth, which perform the image-forming process for the output signals from the IIT, and these are accommodated further in the electrical control system container 33.

The IIT 32 is composed of an imaging unit 37, the wire 38 for driving the said unit, the driving pulley 39, and so forth, and IIT 32 reads a color original sheet for each of the primary colors B(Blue), G(Green), and R(Red) by means of a CCD line sensor and a color filter provided inside the imaging unit 37, converts the data so obtained into digital image signals and then outputs the signals to the IPS.

In the IPS, the B, G, and R signals mentioned above are transformed into the primary colors of the toner, i.e. Y(Yellow), C(Cyan), M(Magenta), and K(Black), and then, with various data processing being applied to the data so obtained for the purpose of enhancing the reproduction fidelity and fineness, and so forth, the IPS converts the toner signals of the process color in harmonious gradation into binary toner signals and outputs them to the IOT 34.

The IOT 34, which is provided with a scanner 40 and a photosensitive material belt 41, converts the image signals from the abovementioned IPS into optical signals in the laster output part 40a and forms a latent image corresponding to the image on the original sheet on the photosensitive material belt 41 by way of the polygon mirror 40b, the lens 40c, and the reflexive mirror 40d. The photosensitive material belt 41, which is driven by the driving pulley 41a, has a cleaner 41b, a charging unit 41c, the individual developing devices for Y, M, C, and K, and a transfer device 41e arranged around it. And, opposite to this transfer device 41e is provided a transfer unit 42, which takes into it the sheet that comes transported to it from the paper tray 35 via the paper transport channel 35a and transfers the colors in the order of Y, M, C, and K, the transfer unit 42 being rotated four turns, for example, for full-color copying in four full colors. The sheet of paper on which the image is so transferred is then transported from the transfer unit 42 via the vacuum transport device 43 to the fixing device 45, where it is fixed, and is thereafter discharged from it. Moreover, the paper transport channel 35a is so designed as to accept the paper fed alternatively from the SSI (Single Sheet Inserter) 35b.

The U/I 36 is designed for use by the user for making the selections of the desired functions and for giving instructions regarding the conditions for the execution of the selected functions, and this system is provided with a color display unit 51 and a hardware control panel 52 installed by the side of the said display unit, and it is further combined with touch board 53, so that instructions can be given directly with the "soft buttons" on the screen. For further details reference is made to U.S. Pat. No. 5,032,903 incorporated herein.

Figure 2:
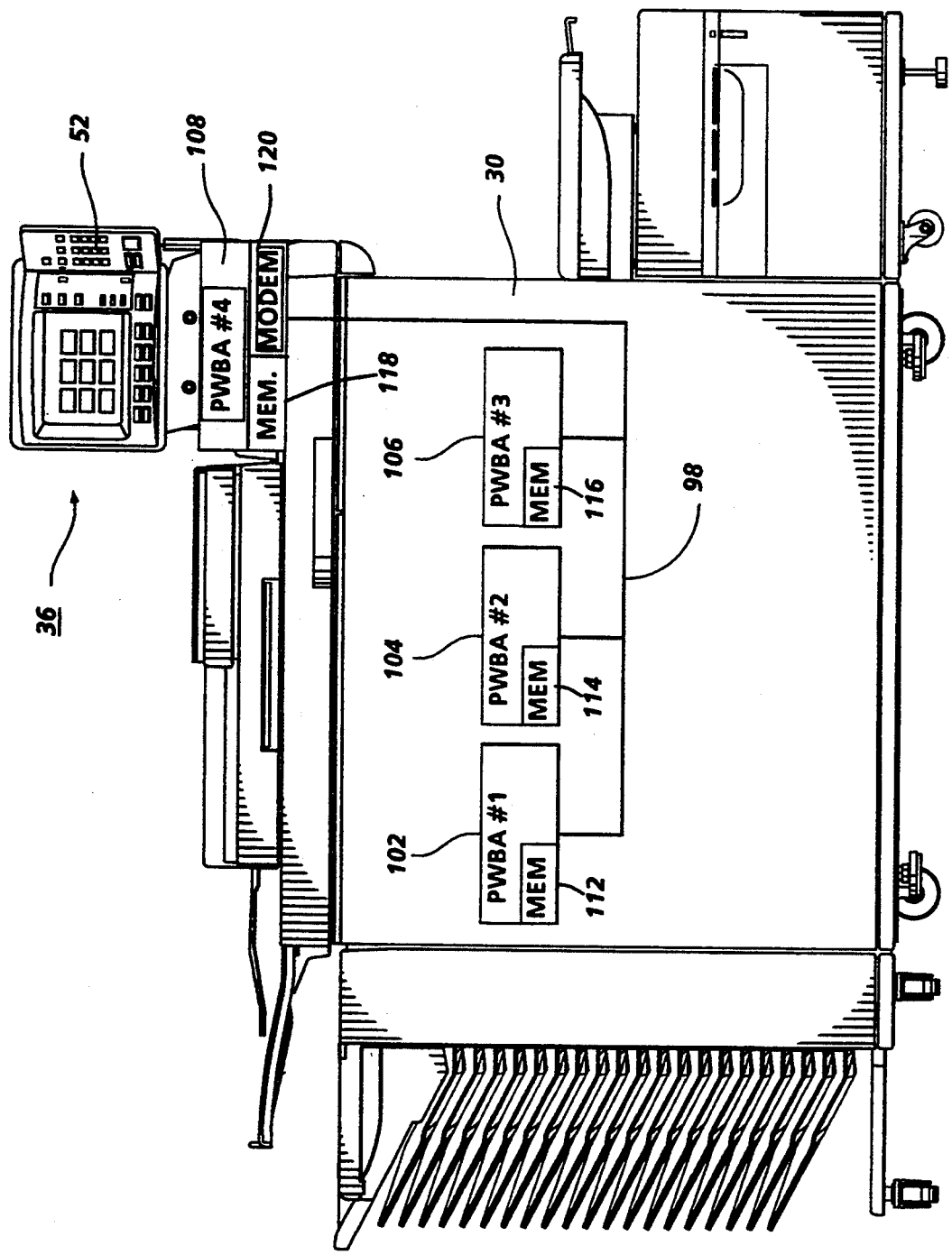
FIG. 2 is a schematic illustrating the control boards for control of the machine shown in FIG. 1.

With reference to FIG. 2, there is illustrated in general block form, the control of the base machine 30 shown in FIG. 1. The base machine is controlled by a plurality of printed wiring boards interconnected to a common channel or bus 98. For purposes of explanation, four printed wiring boards, boards 102 with memory 112, 104 with memory 114, 106 with memory 116, and 108 with memory 116 are illustrated, with printed wiring board 108 being the control for the user interface 36 and the remaining printed wiring boards providing control for predetermined systems and components of the base machine 30. Printed wiring board, 108 is also provided with modem 120 for communication with a remote location. It should be understood that the number of printed wiring boards and the manner of interconnection is merely a design choice and any other suitable control scheme for controlling the base machine is contemplated within the scope of this invention. It should also be noted that one of the printed wiring boards, for example, board 102 could be the master control for the other printed wiring boards or that there could be any number of master slave relationships of the control boards or distributed control of the various functions of the base machine.

Figure 3:
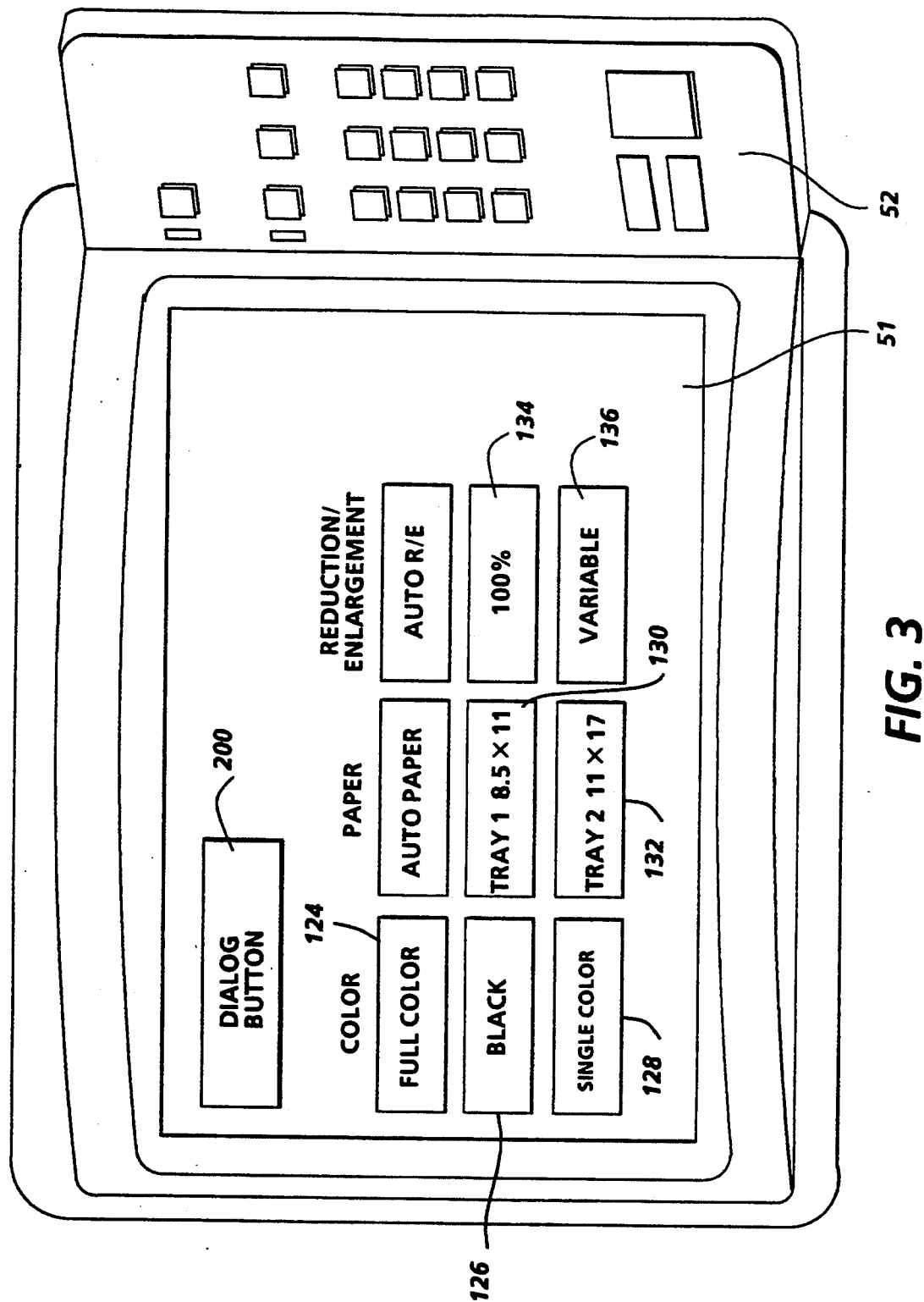
FIG. 3 is an exploded view of the touch monitor screen depicted in FIG. 2.

For purposes of understanding the present invention, it is only necessary to know that the base machine 30 has control software resident on several printed circuit boards that communicate with each other using a common network that the base machine 30 has a user interface 36 that is controlled by software that is also part of the common network, illustrated by printed circuit board 108 and that a modem 120 is provided for remote communication. FIG. 3 is merely a simplified version of the color display unit 51, and hardware control panel 52 of the user interface 36 illustrating various soft control buttons such as full color 124, black 126, single color 128, tray 1 (130), tray 2 (132), and auto reduction/enlargement including 100% (134) and variable 136.

The printed circuit board 108 controlling the user interface 36 is able to monitor all communications on the network 98 and display the communications on the screen 51. Each of the memories 112, 114, 116, and 118 suitably store key status, event, and fault data related to the machine for access by a service representative, and display on screen 51, or for remote transmission via modem 120 to conventional customer support services. Customer support services may include a computer based expert system and/or operator involvement. They would have the capability of taking in customer or operator observations and machine data and using that input to draw conclusions about the state of the machine and about actions that are needed to meet customer requirements and transmit dispatch of a technical representative, when required, and to send a message to stock control to ship parts or materials that would be needed to make necessary machine repairs. In the event of a machine malfunction, the service representative enters a hard key sequence that is recognized by the printed circuit board 108. This recognition of the key sequence by the printed circuit board 108 enables the control 108 to monitor the communications network 98 and display the communications appearing on the screen 51.

The machine operator is able to set up or program the next job or a future machine job as illustrated by the touch screen 51 in FIG. 3. That is, by suitable selection of displayed features, a job can be programmed such as full color, black, or single color, or a particular size paper such as tray 1 containing 8.5×11" copy sheets or tray 2 containing 11"×17" copy sheets, or select a particular reduction/enlargement mode or variable.

It should be understood that the screen 51 of FIG. 3 is exemplary and that additional soft buttons can be displayed in the same frame or subsequent frames and can be selectively engaged by the operator. Also, there can be a selection of suitable hard buttons shown on the panel 52 in accordance well known preprogramming techniques. For example, either hard or soft buttons can be used to select full size copies, 94% size copies, 77% size copies or any variable size copy as well as buttons to engage a recirculating document feeder to operate in a collate mode or non-collate mode. In addition, suitable buttons can enable the operator to select, in a given machine environment, finisher operations such as stapled, non-stapled, non-collated, and such features as duplex copying and offset stacking.

In accordance with the present invention, with reference to FIG. 3, there is shown a "Customer Dialog" soft button 200 which is connected into the remote interactive communication system. While a "soft button" is shown as being preferable, it should be understood that an area of a touch screen display or a hard button could be used as well. The button is present for the customer to press any time there is dissatisfaction with machine performance. The button presses are stored in memory, time stamped and transmitted to the field service office. A button press initiates an interactive dialog with the operator to solicit the operator's observations and comments about the circumstances surrounding the button press. All of the machine data at the time of the button press is combined with the operator's observations and comments to be examined so that the internal machine state can be correlated to the operator's specific requirements. The next time the machine reaches the same internal state, a corrective action is taken before the customer's annoyance threshold is reached. The corrective action could be a machine internal self-adjustment, operator initiated adjustment, or a field service action. The customer would be instructed that pressing the button would not necessarily mean that a service representative would be dispatched, but that the button could be pressed as often as there is dissatisfaction with the performance of the machine. A large number of button presses could result in a service call if the RIC analysis showed that this was justified. This gives the customer a valuable sense of involvement in the process and it gives the seller of the machine a valuable insight into a particular customer's sensitivities. This undoubtedly conveys the message that the seller cares about satisfying the customer and provides the seller with invaluable assistance in achieving that goal.

Figure 4:
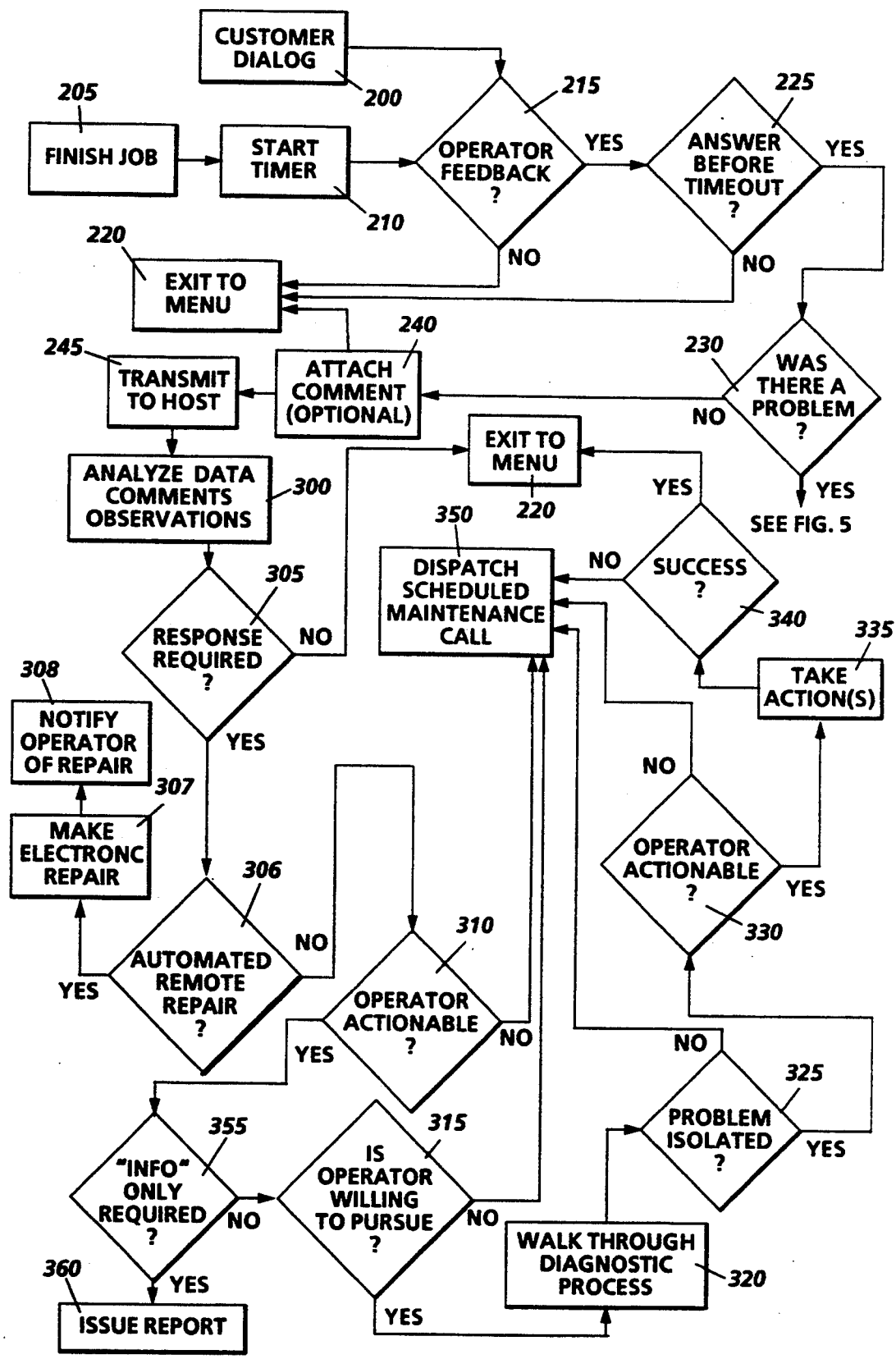
FIG. 4 is a flow chart illustrating how remote interactive feedback is carried out in accordance with the present invention when the feedback is of a general nature.
Figure 5:
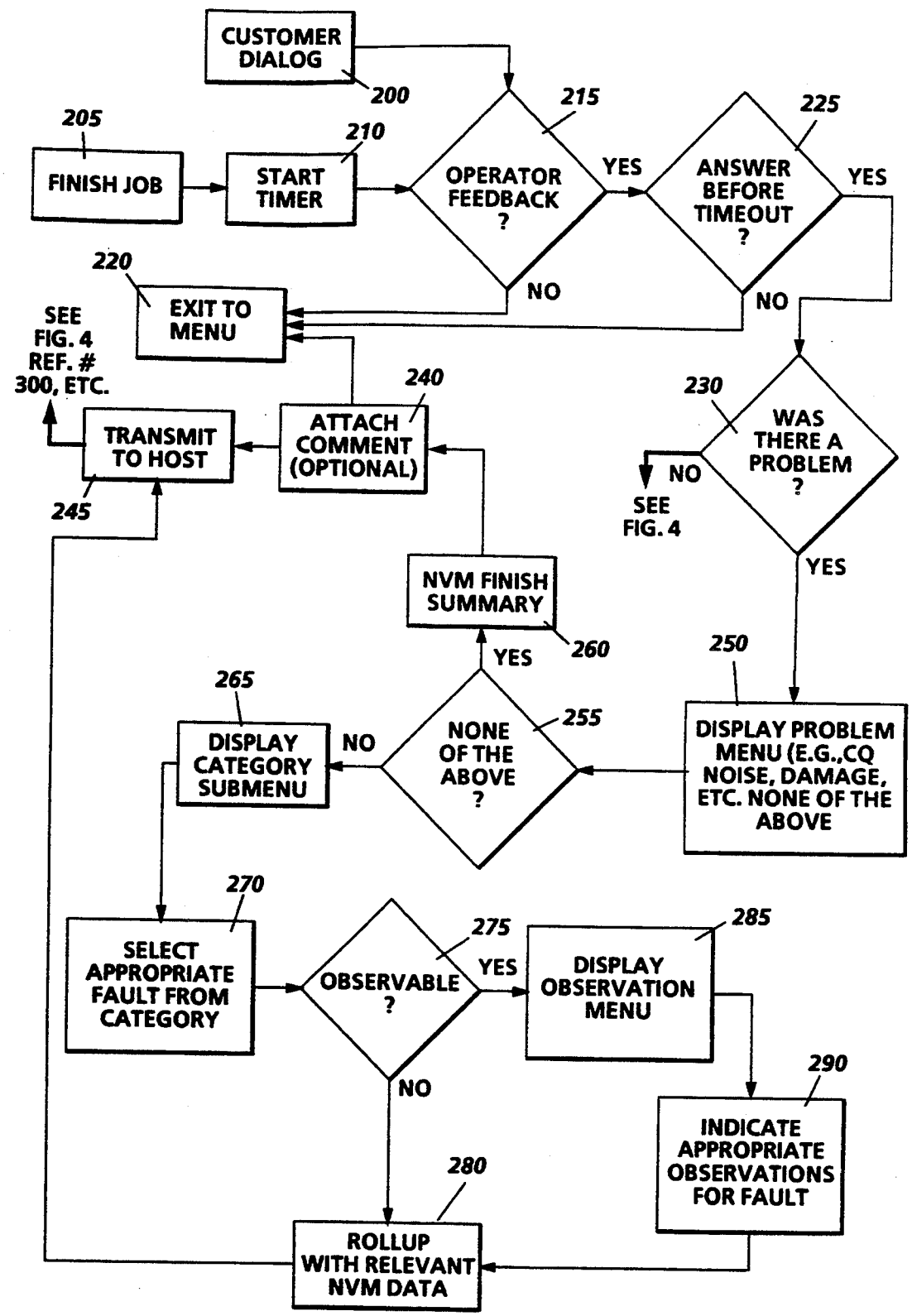
FIG. 5 is a flow chart illustrating how remote interactive is carried out in accordance with the present invention when a problem is indicated by an operator.

FIG. 4, illustrates a typical notification scenario in accordance with the present invention. A job is completed and a decision as to whether or not the completed job is satisfactory is made by the operator. The machine in block 205 starts a timer in block 210 which is set to time out in about 5 seconds. If the job and machine is satisfactory, or the operator has no comments, the machine is allowed to time out. However, if the operator desires, customer dialog button 200 is touched and an operator feedback decision at block 215 is made. If at this time the operator changes his/her mind and does not follow through, the timer will time out and exit will be made at block 220 to the main menu. But, if there is dissatisfaction with machine performance or job copy quality and the operator gives an answer before time runs out at block 225 there will either be an exit to the menu or a decision has to be made as to whether there was a problem or not in block 230. With the answer being YES, instructions will be followed as shown in FIG. 5. With the answer being NO, the console will ask the operator for additional comments in block 240. If there are none, exit to the menu through block 220 is made. However, if comments are desired, they are entered via a keyboard or other input device, such as voice input, and transmitted to the host facility or customer support services as shown in block 245 through the RIC link discussed heretofore. At the host, the comments, data and observations are decoded and analyzed at block 300 and a decision made at block 305 as to whether a response is required. If the answer is NO, exit is made to the menu. If the answer is YES, customer support services decides at 306 if the problem is repairable electronically, makes the repair at 307 if it is, and notifies the operator at 308. If the problem is not repairable electronically the question will be posed as to whether the problem is operator actionable at 310. If the answer is NO, a dispatch scheduled maintenance call at block 350 is made to a technical representative. If the answer is YES, a decision as to whether information only is required, e.g., a tray is skewed, unacceptable paper, etc. is made at 355. If the answer is yes, a report is issued at 360. However, if the answer is NO, the operator is asked in block 315 if he/she is willing to pursue the problem. If the operator is not willing to pursue the problem, a dispatch call at block 350 is made to a technical representative. If the operator is willing to pursue the problem, he/she is walked through a diagnostic process as indicated in block 320. If the problem is not isolated in block 325 a dispatch call at block 350 is made to a technical representative. If the problem is isolated, customer support services decides if the solution is operator actionable at block 330 and if it is, the operator is walked through the procedure as to how to fix the problem as indicated by block 335. If the operator is successful at block 340, exit is made to the main menu at block 345. If the operator is not successful, a dispatch call at block 350 is made to a technical representative.

The flow chart in FIG. 5 depicts the sequence of events if the operator indicated there was a problem in block 230 as discussed above with reference to FIG. 4. A menu will be displayed on console or user interface 36 that will include a series of possible problems at block 250, e.g., copy quality, sheet damage, noise, etc. and the phrase, none of the above. The operator reads the menu and presses the appropriate response to what was the problem and as shown in block 2 55, if the problem is none of the above, no further isolation is possible and a signal goes to the non-volatile memory at block 260 which in turn sends a signal to the U/I 36 to display which asks for optional comments in block 240 while sending the fault indication to the RIC system as indicated in block 245. At this point, the procedure is the same as described above as shown in blocks 300 through 350 with respect to FIG. 4 for the treatment of optional comments. However, if the operator answers NO to the question in block 255, (none of the above ?), a submenu is displayed at block 265 and an appropriate fault is either selected or not selected at block 270. If a fault is selected, the operator is asked at block 275 for observables, such as, is there a jam, is there a noise, etc., which would be in a display menu at block 285. The appropriate observable is indicated through block 290 and transmitted to block 280 for transmission to host 245 for analysis and action in accordance with the procedure outlined in blocks 300 through 350 of FIG. 4. If a fault is not selected at block 270 and there are no observables, a signal is sent through observables block 275 to block 280 and the relevant non volatile memory data is sent to the host RIC system 245 through blocks 235 and 240.

It should be understood that the scope of the present invention is intended to cover and provide a new and improved technique for notification of precise customer dissatisfaction with performance quality or copy quality of a particular machine. Customer satisfaction with a particular machine is enhanced by the use of a RIC switch and collection of information on customer requirements for that particular customer's satisfaction. The system gives a customer an outlet to express immediate reaction to machine performance while simultaneously giving the machine seller the context of the customer dissatisfaction, i.e., the data provided to the RIC device is from the moment the dialog button is pushed and is processed in real time. In other words, it gives the machine seller a snapshot of the customer's thoughts at that particular instant in time which is important in case the seller decides that the customer needs to be contacted personally. It should be understood that while this invention has been described with reference to the use of a remote interactive control system, the operator/machine interactive feedback system of the present invention can be effective without the use of customer support services, that is, a microprocessor in a machine could communicate with and operator. The microprocessor controller may comprise, for example, an 8085-type controller or any functionally similar device. Instructions may be hard-coded on the device, but more commonly the device will comprise an EPROM (Erasable Programmable Read Only Memory) device to more readily accommodate software upgrades. In this case, the microprocessor would attempt to resolve the problem locally.

While the invention has been described with reference to the structure disclosed, it is not confined to the details set forth, but it is intended to cover such modifications or changes as may come within the scope of the following claims.

I claim:

1. In an image forming apparatus having image processing components for forming images on a medium, a controller for directing the operation of the image forming components including an operator interface connected to the controller, the operator interface including a interactive display, the method of enabling an operator to observe the image forming process and the copy sheet output of that process and communicate observations to remote customer support services for response to the operator observation, if required, comprising the steps of:

monitoring the operation of the image forming apparatus relative to forming images on the medium;
  subjectively detecting the copy quality of the copy sheet output;
  initiating dialog with the remote customer support services through the interactive display in accordance with an operator's threshold dissatisfaction with images on a copy sheet;
  selecting at least one option displayed on the interactive display for transmission to the remote customer support services;
  determination by the remote customer support services if the condition is one that requires correction; and
  initiation of corrective action, if required, by the customer support services either directly to the image forming component of the image forming apparatus through software parameters, by means of the operator, or through a maintenance call to a technical representative.

2. The method of claim 1, wherein said customer support services comprises a computer based automated expert system.

3. The method of claim 1, wherein said customer support services includes a customer service operator that interacts through the interactive display with the operator of the image forming apparatus.

4. In an image forming apparatus having image processing components for forming images on a medium, a controller for directing the operation of the image forming components, an operator initiated method of signaling a remote station of the individual operator's subjective perception of the quality of the image placed on the medium by the image forming apparatus, such as, copy quality, comprising the steps of:

monitoring the operation of the image forming apparatus relative to forming images on the medium;
  subjectively examining the image placed on the medium by the image forming apparatus;
  subjectively determining whether the image placed on the medium is satisfactory; and
  initiating a notification to the remote location if the operator is dissatisfied with the image on the medium to thereby supply contextually relevant data to be considered by a technician.

5. The method of claim 4, including the step of creating an operator profile in said remote location for the operator initiating said notification to be used to particularize the image forming apparatus for that operator's sensitivities.

6. The method of claim 5, including the step of incorporating said operator profile into control rules which determine when certain actions are to be taken or how certain adjustments are to be made for the particular operator.

7. An image forming apparatus having a control panel and image forming components for forming images on a medium, comprising:
   a controller connected to the control panel for directing the operation of the image processing components;
   an operator dialog button positioned on the control panel, said operator dialog button being adapted to be pushed when an operator has reached a subjective tolerance threshold as to personal dissatisfaction with the quality of images on the medium, as oppose to, diagnostic observables which relate to the process performed by the image forming apparatus; and
   a remote station adapted to receive a signal from said customer dialog button when said customer dialog button is pressed by an operator of the image forming apparatus and record the same in memory for future use.

8. The apparatus of claim 7, wherein said controller includes software control dialog which facilitate the retrieval of contemporaneous operator observations about the image forming apparatus and output of the apparatus and combining of the observations with apparatus data for diagnostic analysis.

9. An image forming apparatus having a control panel and image forming components for forming images on a medium comprising:
   a controller connected to the control panel for directing the operation of the image processing components; and
   an operator dialog area positioned on the control panel, said operator dialog area being adapted when touched by an operator to initiate dialog between the operator and said controller such that the operator can key contemporaneous subjective image on medium quality observations into said controller with immediate feedback from said controller to the image forming apparatus to adjust image quality on the medium to the satisfaction of the operator.

10. The apparatus of claim 9, including a remote computer based automated expert system linked to said controller, and wherein said expert system is adapted to take input of operator observations and use the input to draw conclusions about the state of the image forming apparatus and indicate on said control panel what action needs to be taken to satisfy the operator.

11. The apparatus of claim 10, wherein said remote computer based automated expert system is adapted to make electronic repair to the image forming apparatus through manipulation of software control parameters.

12. In an image forming apparatus having image processing components for forming images on a medium, a controller for directing the operation of the image forming components including an operator interface connected to the controller, the operator interface including a interactive display, the method of enabling an operator to observe the image forming process and the copy sheet output of that process and communicate observations to remote customer support services for response to the operator observation, if required, comprising the steps of:
   monitoring the operation of the image forming apparatus relative to forming images on the medium;
   detecting a machine or copy quality defect condition;
   initiating dialog with the remote customer support services through the interactive display in accordance with said machine or copy quality condition detected;
   selecting at least one machine condition option displayed on the interactive display for transmission to the remote customer support services;
   determination by the remote customer support services if the condition is one that requires correction;
   initiation of corrective action, if required, by the customer support services either directly to the image forming component of the image forming apparatus through the software parameters, by means of the operator, or through a maintenance call to a technical representative, and
   inhibiting interaction between the operator and the interactive display after a predetermined time has elapsed if the operator does not interact with the interactive display before the predetermined time expires.

* * * * *